E. SCHERING.
Purifying Salicylic Acid by Dialysis.

No. 196,254. Patented Oct. 16, 1877.

Witnesses:
M. Gardner
Alex. Scott

Inventor
Ernst Schering
per A. Schücking
Attorney

UNITED STATES PATENT OFFICE.

ERNST SCHERING, OF BERLIN, GERMANY.

IMPROVEMENT IN PURIFYING SALICYLIC ACID BY DIALYSIS.

Specification forming part of Letters Patent No. 196,254, dated October 16, 1877; application filed August 9, 1877.

*To all whom it may concern:*

Be it known that I, ERNST SCHERING, of the city of Berlin, German Empire, have invented a certain new and useful Dialysator or Purifier for Salicylic Acid; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to a novel process of obtaining dialysed or purified salicylic acid; and the invention consists in the process and apparatus hereinafter described and claimed.

Figure 1:
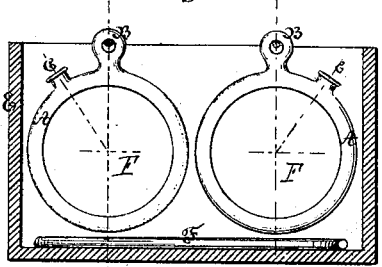
Figure 2:
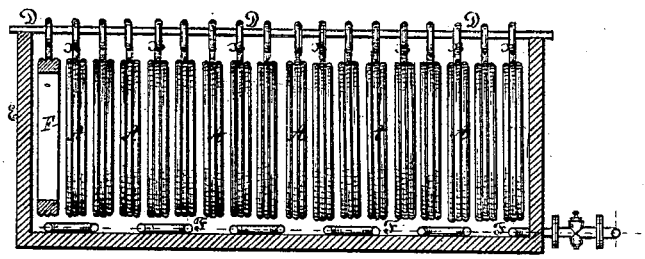
Figure 3:
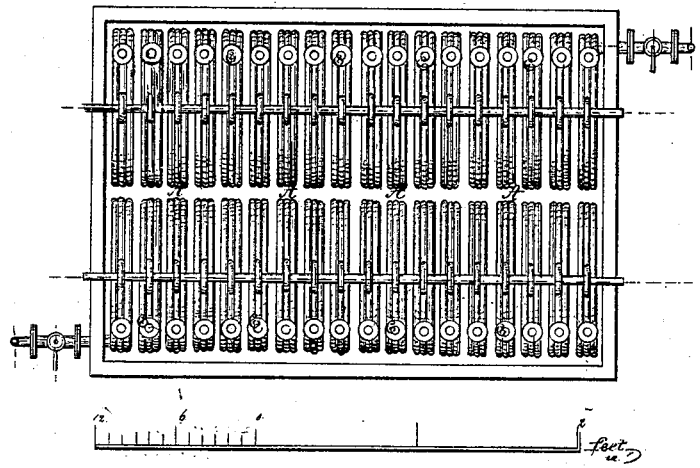

In the accompanying drawing, forming part of this specification, Figure 1 is a transverse section of the apparatus. Fig. 2 is a longitudinal section; and Fig. 3 is a plan or top view of the same.

In carrying out my invention, I take carbolate of sodium and subject it to the action of heated dry currents of carbonic-acid gas in closed retorts, which will cause the production of salicylate of soda. The latter is dissolved in water, and to the solution is added a mineral acid, preferably sulphurous acid, ($SO_2$,) by means of which the salicylic acid is separated from the alkaline or other bases, and precipitated.

The salicylic acid, partially purified by the sulphurous acid, is again dissolved in water, and is heated, together with zinc-dust, added thereto, whereby a perfect whitening or bleaching of the solution is effected.

The product separated from the above solution by filtration is the so-called amorphous salicylic acid, which is dissolved in warm alcohol, and after the cooling of the same there is obtained, in the form of crystals, the so-called crystallized salicylic acid. The latter, although having been partially purified, still contains substances of a resinous nature, which I propose to remove in the manner hereinafter set forth.

It is the object of my process and apparatus to obtain a chemically-pure salicylic acid, and I have termed the product of the process "Acidum salicylicum dialysatum."

I take the product of the previous steps of the process of manufacture, or the crystallized salicylic acid, and dissolve it in diluted alcohol, and then place the solution of salicylic acid and alcohol in a series of filters, consisting of porcelain, earthenware, or other rings, A, which are provided with sides, F, of animal membrane or parchment.

The rings are provided with an opening, C, for introducing the solution, also with perforated ears B, for suspending the same from a glass rod, D, within a clay vessel, E. Said vessel or tank E contains a coil of pipe, F, for the circulation of steam, and is used for heating a water-bath.

The solution of the salicylic acid and diluted alcohol, after its introduction into the filters, will filter or percolate through the membraneous sides of the filtering-chambers, and in doing so the tarry foreign matters present in the acid will be separated therefrom.

The process of filtration may be prolonged for any length of time, but generally it ceases at the expiration of twelve hours.

The filtered salicylic acid contained in the tank F is drawn off with the contents of the same, and is permitted to cool in a separate vessel in the presence of sulphurous acid. ($SO_2$.) This will cause the precipitation and crystallization of the salicylic acid in the form of bright needles or crystals. After the same have been dried in a suitable manner to remove moisture, the product is a chemically-pure salicylic acid, perfectly devoid of the tarry foreign matters which render the acid heretofore manufactured objectionable.

Having thus described my invention, what I claim as new, and desire to secure by Letters Patent, is—

1. The process of purifying or dialysing salicylic acid herein described, consisting in the filtration of the acid through animal membrane, substantially as and for the purpose set forth.

2. A dialysator consisting of a tank, E, heating-coil F, and filters formed of porcelain rings, having membraneous sides, as and for the purpose set forth.

In testimony that I claim the foregoing as my own I affix my signature in presence of two witnesses.

ERNST SCHERING.

Witnesses:
HERMANN KREISMANN,
EDWARD P. MACLEAN.